(12) United States Patent
Strand et al.

(10) Patent No.: US 7,285,587 B2
(45) Date of Patent: Oct. 23, 2007

(54) FLAME RETARDANT POLYESTER COMPOSITIONS FOR CALENDERING

(75) Inventors: Marc Alan Strand, Kingsport, TN (US); Rodney Layne Piner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 55 days.

(21) Appl. No.: 10/706,669

(22) Filed: Nov. 12, 2003

(65) Prior Publication Data

US 2004/0127609 A1    Jul. 1, 2004

Related U.S. Application Data

(60) Provisional application No. 60/435,584, filed on Dec. 20, 2002.

(51) Int. Cl.
*C08K 5/523* (2006.01)
*C08K 5/12* (2006.01)

(52) U.S. Cl. ............... 524/126; 524/127; 524/128; 524/129; 524/277; 524/318; 524/292; 524/296; 524/297; 524/298

(58) Field of Classification Search ........ 524/126–129, 524/277, 318, 292–297
See application file for complete search history.

(56) References Cited

U.S. PATENT DOCUMENTS

| | | |
|---|---|---|
| 2,012,267 A | 8/1935 | Carothers |
| 2,044,612 A | 6/1936 | Jaeger |
| 3,186,961 A | 6/1965 | Sears |
| 3,658,978 A | 4/1972 | Ancker |
| 3,873,496 A | 3/1975 | Hills |
| 3,883,478 A | 5/1975 | Gresham |
| 4,045,431 A | 8/1977 | Fagerburg |
| 4,258,153 A | 3/1981 | Yomamoto et al. |
| 4,340,526 A | 7/1982 | Petke et al. |
| 4,356,282 A * | 10/1982 | Largman ............... 524/398 |
| 4,391,938 A | 7/1983 | Memon et al. |
| 4,450,250 A | 5/1984 | McConnell et al. |
| 4,506,043 A | 3/1985 | Ogawa et al. |
| 4,524,191 A * | 6/1985 | Nakamura et al. ........ 525/425 |
| 4,558,085 A * | 12/1985 | Lee ..................... 524/299 |
| 4,814,426 A | 3/1989 | Utsumi et al. |
| 4,837,254 A | 6/1989 | Branscome |
| 4,873,270 A | 10/1989 | Aime et al. |
| 4,963,418 A | 10/1990 | Isaka et al. |
| 4,996,291 A | 2/1991 | Yoshinaka et al. |
| 5,017,680 A | 5/1991 | Sublett |
| 5,256,714 A | 10/1993 | Liu et al. |
| 5,290,631 A | 3/1994 | Fleury et al. |
| 5,399,595 A | 3/1995 | Sublett et al. |
| 5,484,632 A | 1/1996 | Mercer, Jr. et al. |
| 5,489,470 A | 2/1996 | Noda |
| 5,498,692 A | 3/1996 | Noda |
| 5,502,116 A | 3/1996 | Noda |
| 5,532,049 A | 7/1996 | Masuda et al. |
| 5,534,570 A | 7/1996 | Shih et al. |
| 5,536,564 A | 7/1996 | Noda |
| 5,589,126 A | 12/1996 | Shih et al. |
| 5,602,227 A | 2/1997 | Noda |
| 5,618,855 A | 4/1997 | Noda |
| 5,624,987 A | 4/1997 | Brink et al. |
| 5,654,347 A | 8/1997 | Khemani et al. |
| 5,696,176 A | 12/1997 | Khemani et al. |
| 5,703,160 A | 12/1997 | Dehennau et al. |
| 5,750,605 A * | 5/1998 | Blumenthal et al. ........ 524/230 |
| 5,824,398 A | 10/1998 | Shih |
| 5,859,116 A | 1/1999 | Shih |
| 5,900,322 A | 5/1999 | Buchanan et al. |
| 5,928,788 A | 7/1999 | Riedl |
| 5,958,581 A | 9/1999 | Khanarian et al. |
| 5,965,648 A | 10/1999 | Brink et al. |
| 5,998,005 A | 12/1999 | Kanno |
| RE36,548 E | 2/2000 | Noda |
| 6,025,061 A | 2/2000 | Khanarian et al. |
| 6,054,551 A | 4/2000 | Cornell et al. |
| 6,068,910 A * | 5/2000 | Flynn et al. ............ 428/141 |

(Continued)

FOREIGN PATENT DOCUMENTS

DE      100 40 691 A1    2/2002

(Continued)

OTHER PUBLICATIONS

U.S. Appl. No. 10/086,905, filed Mar. 27, 2003, Moskala et al.

(Continued)

*Primary Examiner*—Peter Szekely
(74) *Attorney, Agent, or Firm*—Eric D. Middlemas; Louis N. Moreno; Bernard J. Graves, Jr.

(57) ABSTRACT

Flame retardant polyester compositions suitable for calendering may be prepared from polyesters having crystallization half time of at least 5 minutes, a plasticizer, a phosphorus-containing flame retardant miscible with the plasticized polyester, and an additive effective to prevent sticking of the polyester to the calendar rolls. Also disclosed are processes for flame retardant films or sheets by calendering the above compositions and the flame retardant films or sheets produced therefrom. These films and sheets have excellent appearance, flexibility, and flame retardancy, and can be used in a wide range of decorative and packaging applications.

101 Claims, No Drawings

U.S. PATENT DOCUMENTS

| | | | |
|---|---|---|---|
| 6,077,931 A | 6/2000 | Noda | |
| 6,103,857 A | 8/2000 | Jones et al. | |
| 6,114,431 A | 9/2000 | Lee et al. | |
| 6,127,512 A | 10/2000 | Asrar et al. | |
| 6,160,199 A | 12/2000 | Noda | |
| 6,174,990 B1 | 1/2001 | Noda | |
| 6,231,970 B1 | 5/2001 | Anderson et al. | |
| 6,326,435 B1 | 12/2001 | Takayama et al. | |
| 6,350,530 B1 | 2/2002 | Morikawa et al. | |
| 6,482,872 B2 | 11/2002 | Downie | |
| 6,538,054 B1 * | 3/2003 | Klatt et al. | 524/101 |
| 6,551,688 B2 | 4/2003 | Moskala et al. | |
| 6,551,699 B1 | 4/2003 | Flynn | |
| 6,569,990 B1 | 5/2003 | Noda | |
| 6,620,869 B2 | 9/2003 | Asrar et al. | |
| 6,632,390 B1 | 10/2003 | Shelby et al. | |
| 6,787,245 B1 | 9/2004 | Hayes | |
| 2001/0027225 A1 | 10/2001 | Downie | |
| 2002/0061944 A1 | 5/2002 | Asrar et al. | |
| 2003/0060542 A1 | 3/2003 | Witt et al. | |
| 2003/0145518 A1 | 8/2003 | Noda et al. | |
| 2003/0171471 A1 | 9/2003 | Pritschins et al. | |
| 2003/0187149 A1 | 10/2003 | Schmidt et al. | |
| 2003/0212244 A1 | 11/2003 | Hayes et al. | |
| 2004/0024101 A1 | 2/2004 | Hayes | |
| 2004/0024102 A1 | 2/2004 | Hayes et al. | |
| 2004/0039092 A1 | 2/2004 | Asrar et al. | |
| 2004/0068059 A1 | 4/2004 | Katayama et al. | |
| 2004/0152810 A1 | 8/2004 | Takenaka et al. | |
| 2005/0113556 A1 * | 5/2005 | Strand et al. | 528/298 |

FOREIGN PATENT DOCUMENTS

| | | |
|---|---|---|
| EP | 0 724 947 A1 | 8/1996 |
| EP | 0 744 439 A1 | 11/1996 |
| EP | 0 484 818 | 1/1997 |
| EP | 0 965 615 A1 | 12/1999 |
| EP | 1 054 038 A1 | 11/2000 |
| EP | 1 375 556 A2 | 2/2004 |
| EP | 1 529 808 A2 | 5/2005 |
| EP | 1 529 809 A1 | 5/2005 |
| GB | 805 586 A | 12/1958 |
| GB | 805 587 | 12/1958 |
| GB | 805588 | 12/1958 |
| GB | 815 991 | 7/1959 |
| GB | 1 323 478 | 9/1973 |
| JP | 1-138260 A | 5/1989 |
| JP | 1-49741 B2 | 10/1989 |
| JP | 8-142290 A | 11/1990 |
| JP | 10-291225 A | 11/1990 |
| JP | 4-62144 | 2/1992 |
| JP | 4-117432 | 4/1992 |
| JP | 4-166309 | 6/1992 |
| JP | 5-271397 A | 10/1993 |
| JP | 7-60924 A | 3/1995 |
| JP | 7-278418 A2 | 10/1995 |
| JP | 8-283547 A | 10/1996 |
| JP | 9-40823 A | 2/1997 |
| JP | 9-66590 A2 | 3/1997 |
| JP | 9-217014 | 8/1997 |
| JP | 9-272191 A | 10/1997 |
| JP | 11-158358 A | 6/1999 |
| JP | 2-986197 | 10/1999 |
| JP | 11-343353 A | 12/1999 |
| JP | 2000-136294 A | 5/2000 |
| JP | 2000-302951 A | 10/2000 |
| JP | 2000-327891 | 11/2000 |
| JP | 2000-336256 A | 12/2000 |
| JP | 2001-18344 A | 1/2001 |
| JP | 2001-40197 | 2/2001 |
| JP | 2001-64496 A | 3/2001 |
| JP | 2001-214044 A | 8/2001 |
| JP | 2001-279068 A | 10/2001 |
| JP | 2001-302833 A | 10/2001 |
| JP | 2001-354842 A | 12/2001 |
| JP | 2002-53740 A | 2/2002 |
| JP | 2002-53741 A | 2/2002 |
| JP | 2002-121362 A | 4/2002 |
| JP | 2002-129002 A | 5/2002 |
| JP | 2002-129483 A | 5/2002 |
| JP | 00186191 A | 7/2002 |
| JP | 2002-275217 A | 9/2002 |
| JP | 2002-294043 A | 10/2002 |
| JP | 2003-20386 A | 1/2003 |
| JP | 2003-128773 A | 5/2003 |
| JP | 2003-128889 A | 5/2003 |
| JP | 2003-128890 A | 5/2003 |
| JP | 2003-128894 A | 5/2003 |
| JP | 2003-154539 A | 5/2003 |
| JP | 2003-155401 A | 5/2003 |
| JP | 2003-155402 A | 5/2003 |
| JP | 2003-171537 A | 6/2003 |
| JP | 2003-191266 A | 7/2003 |
| JP | 2003-201391 A | 7/2003 |
| JP | 2003-277592 A | 10/2003 |
| JP | 2004-143353 A | 5/2004 |
| JP | 2001-200146 A | 7/2004 |
| JP | 2004-182759 A | 7/2004 |
| JP | 2004-238534 A | 8/2004 |
| JP | 2005-8771 A | 1/2005 |
| WO | WO 87/03291 A | 6/1987 |
| WO | WO 94/28061 A | 12/1994 |
| WO | WO 95/14734 | 6/1995 |
| WO | WO 95/20614 A1 | 8/1995 |
| WO | WO 97/10302 | 3/1997 |
| WO | WO 97/42260 | 11/1997 |
| WO | WO 97/49757 A | 12/1997 |
| WO | WO 99/23146 A1 | 5/1999 |
| WO | WO 99/47605 A | 9/1999 |
| WO | WO 00/37544 A1 | 6/2000 |
| WO | WO 01/85451 A1 | 11/2001 |
| WO | WO 02/28967 A1 | 4/2002 |
| WO | WO 2004/029147 A1 | 4/2004 |

OTHER PUBLICATIONS

Database WPI, Section CH, Week 9702, XP-002106151, Derwent Publications, Ltd., Oct. 29, 1996, London, GB.
Jim Butschli, Packaging World, pp. 26-28, Jun. 1997.
W.V. Titow, PVC Technology, 4th Edition, pp. 803-848 (1984), Elsevier Publishing Co.
Material Safety Data Sheet, "EASTAR" PETG Copolyester 6763, Oct. 23, 1997.
Anonymous Research Disclosure 23314, Sep. 1983.
Fox equation, T.G. Fox, Bull. Am. Phys. Soc., 1, 123 (1956).
"The Technology of Plasticizers", by J. Kern Sears and Joseph R. Darby, published by Society of Plastic Engineers/Wiley and sons, New York, 1982, pp. 134-137.
Coleman et al., Polymer 31, (1990), 1187-1203.
International Search Report dated Apr. 27, 2005, for PCT/US2004/041737 (80077).
International Search Report dated Apr. 27, 2005, for PCT/US2004/041638 (80078).
John Davis, Flame retardants: halogen-free systems (including phosphorus additives), Plastics Additives: An A-Z Reference, 1998, pp. 287-286, Chapman & Hall, London.
U.S. Appl. No. 10/722,870, filed Nov. 26, 2003, Strand et al.
Elias, H., *Macromolecules*, Plenum Press: NY, 1977, p. 391.

* cited by examiner

FLAME RETARDANT POLYESTER COMPOSITIONS FOR CALENDERING

CROSS REFERENCES TO RELATED APPLICATIONS

This application claims the benefit of U.S. Provisional Application Ser. No. 60/435,584 filed Dec. 20, 2002.

TECHNICAL FIELD OF THE INVENTION

This invention pertains to polyester compositions for calendering and, more specifically, to flame retardant polyester compositions for calendering. The invention further pertains to calendering processes for flame retardant polyester compositions to produce a flame retardant film or sheet and to the flame retardant polyester film or sheet produced by such calendering processes.

BACKGROUND OF THE INVENTION

Calendering is an economic and highly efficient means to produce film and sheet from plastics such as plasticized and rigid poly(vinyl chloride), abbreviated herein as "PVC", and polypropylene compositions. The film and sheet usually have a thickness ranging from about 2 mils (0.05 mm) to about 80 mils (2.0 mm). Calendered PVC film or sheet are readily thermoformed into various shapes can be used in a wide range of applications including packaging, pool liners, graphic arts, transaction cards, security cards, veneers, wall coverings, book bindings, folders, floor tiles, and products which are printed, decorated, or laminated in a secondary operation. Additional discussion on polypropylene resin compositions used in calendering processes may be found in Japan Application No. Hei 7-197213 and European Patent Application No. 0 744 439 A1.

By contrast, conventional processing of polyesters into film or sheet involves extruding a polyester melt through a manifold of a flat die. Manual or automatic die lip adjustment is used to control thickness across a web of material. Water-cooled chill rolls are used to quench the molten web and impart a smooth surface finish. Although extrusion processes produce film and sheet of excellent quality, extrusion methods do not have the throughput and economic advantages of calendering processes.

PVC compositions are, by far, the largest segment of the calendered film and sheet business. Small amounts of other thermoplastic polymers such as, for example, thermoplastic rubbers, certain polyurethanes, talc-filled polypropylene, acrylonitrile/buta-diene/styrene terpolymers (ABS resins), and chlorinated polyethylene, are sometimes processed by calendering methods. By contrast, polyester polymers such as, for example, poly(ethylene terephthalate), abbreviated herein as "PET", or poly(1,4-butylene terephthalate), abbreviated herein as "PBT", are difficult to calender successfully. For example, PET polymers with inherent viscosity values of about 0.6 dL/g have insufficient melt strength to perform properly on the calendering rolls. Also, when the polyester is fed to the rolls at typical processing temperatures of 160° C. to 180° C., the PET polymer crystallizes causing a non-homogeneous mass which causes high forces on the calender bearings and is unsuitable for further processing. Another problem is the tendency of polyester polymers to hydrolyze during processing in the molten or semi-molten state on rolls exposed to atmospheric moisture. Typical PET polymers also have a tendency to stick to the calendering rolls at typical processing temperatures. Avoidance of these difficulties often requires a careful selection of polymer properties, additives, and processing conditions. The calendering of various polyester compositions has been described, for example, in U.S. Pat. Nos. 5,998,005; 6,068,910; 6,551,688; U.S. patent application Ser. No. 10/086,905; Japan Patent Application No.'s 8-283547; 2001-274010; 7-278418; 2000-243055; 10-363-908; 2000-310710; 2001-331315; 11-158358; and World Patent Application No. 02/28967.

Many current applications for calendered films have stringent flammability requirements. The calendered films prepared from polyesters typically do not show sufficient flame retardancy to be useful in many commercial applications. Further, the flame retardants often used with various polymer compositions often are not compatible with molten polyesters, are reactive with the polyester or its various additives, or do not impart the desired degree of flame retardancy at suitable concentrations.

To obtain film or sheet with desirable levels of flexibility, polymeric materials such as PVC and cellulose esters must be plasticized before calendering. Most other thermoplastic resins, however, such as polyesters, polyamides and polyolefins, do not typically contain a plasticizer when processed in the molten state to form rigid molded or extruded objects. Plasticizers increase the flexibility and softness of calendared polyester films, improve the processing of the polyester, and help to prevent sticking of the polyester to the calender rolls. The addition of plasticizers, however, generally increases the available fuel and results in increased flammability. The increased flammability of plasticized polyesters has created a need for flame-retardant, plasticized, polyester compositions suitable for the production of film and sheet by calendering as a more economical alternative to extrusion processes.

SUMMARY OF THE INVENTION

We have discovered that flame retardant polyester compositions suitable for calendering may be prepared from polyesters having crystallization half time of at least 5 minutes, a plasticizer, a flame retardant miscible with the plasticized polyester, and a release additive. Thus, the present invention provides a flame retardant polyester composition for calendering, comprising:

(a) a polyester having a crystallization half time from a molten state of at least 5 minutes wherein the polyester is a random copolymer;
(b) a plasticizer;
(c) a phosphorus-containing flame retardant miscible with the polyester plasticized with the plasticizer; and
(d) an additive effective to prevent sticking of the polyester to calendering rolls.

The polyester composition contains a polyester which a random copolymer, an additive to prevent sticking of the polyester to the calender rolls, and a plasticizer, which provides the flexibility, softness, and processing characteristics that are particularly suitable for production of polyester films and sheets by calendering. The polyester composition also is flame retardant, which makes the film and sheet produced therefrom particularly desirable for commercial applications.

Another embodiment of the invention is a flame retardant polyester composition for calendering comprising:

(a) about 50 to about 95 weight percent of a polyester having a melting temperature of less than 220° C. and exhibiting more than 1 percent crystallinity after annealing for 2000 minutes at a temperature at which the polyester has a maximum crystallization rate, wherein the polyester is a random copolymer;

(b) about 5 to about 50 wt % of a plasticizer miscible with the polyester, based on the total weight of the polyester composition; and (c) a phosphorus-containing flame retardant miscible with the polyester plasticized with the plasticizer.

For the latter composition the presence of additive to prevent sticking of the polyester to the calender rolls is optional. In addition, the present invention provides processes for flame retardant films or sheets by calendering the above compositions and for the flame retardant films or sheets produced therefrom. These films and sheets have an excellent appearance, flexibility, and flame retardancy and can be used in a great variety of decorative and packaging applications. The films and sheets are readily thermoformed into various shapes for specific packaging applications for both food and non-food products. They may be printed with a wide variety of inks and may be laminated either in-line or off-line with fabrics or other plastic films or sheets. Some specific end uses include graphic arts, transaction cards, security cards, veneers, wall coverings, book bindings, folders and the like.

DETAILED DESCRIPTION

Flame retardant polyester compositions may be calendered using conventional calendering processes to produce flame retardant films and sheets. Thus, in a general embodiment, the present invention provides a flame retardant polyester composition for calendering comprising a polyester having a crystallization half time from a molten state of at least 5 minutes in which the polyester is a random copolymer; a plasticizer; a phosphorus-containing flame retardant miscible with the polyester plasticized with the plasticizer; and an additive effective to prevent sticking of the polyester to calendering rolls. The invention further provides processes for flame retardant films or sheets and the film and sheets prepared therefrom. The calendered films and sheets typically have a thickness in the range of about 2 mils (0.05 mm) to about 80 mils (2 mm).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint (s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxy substituents such as, for example, hydroquinone. The term "residue", as used herein, means any organic structure incorporated into a polymer or plasticizer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The flame retardant polyester compositions of present invention are prepared from polyesters comprising dicarboxylic acid residues, diol residues, and repeating units. A "repeating unit", as used herein, means an organic structure having a dicarboxylic acid and a diol residue bonded through a carbonyloxy group. The polyesters of the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid out of a total of 100 mole % acid residues. Thus, there are 30 moles of isophthalic acid among every 100 moles of acid residues. In another example, a polyester containing 30 mole % ethylene glycol, based on the total diol residues, means the polyester contains 30 mole % ethylene glycol out of a total of 100 mole % diol residues. Thus, there are 30 moles of ethylene glycol among every 100 moles of diol residues. In a third example, a polyester containing 30 mole % of a monomer, which may be a dicarboxylic acid, a diol, or hydroxycarboxylic acid, based on the total repeating units, means that the polyester contains 30 mole % monomer out of a total of 100 mole % repeating units. Thus, there are 30 moles of monomer residues among every 100 moles of repeating units.

The polyesters of this invention have a crystallization half time from a molten state of at least about 5 minutes. The crystallization half time may be, for example, greater than 7 minutes, greater than 10 minutes, greater than 12 minutes, greater than 20 minutes, greater than 100 minutes, and greater than 300 minutes. Typically, polyesters exhibiting a crystallization half time of at least 5 minutes are copolyesters or random copolymers. The term "random copolymer", as used herein, means that the polyester comprises more than one diol and/or diacid residues in which the different diol or diacid residues are randomly distributed along the polymer chain. Thus, the polyesters of the instant invention are not "homopolymers" or "block copolymers". Preferably, the polyesters have a substantially amorphous or semicrystalline morphology, meaning that the polyesters comprise substantially unordered regions of polymer. Amorphous or semicrystalline polymers typically exhibit either only a glass transition temperature (abbreviated herein as "Tg") alone or a glass transition temperature in addition to a melting point (abbreviated herein as "Tm"), as measured by well-known techniques such as, for example, differential scanning calorimetry ("DSC"). The desired crystallization kinetics from the melt also may be achieved by the addition of polymeric additives such as, for example, plasticizers, or by altering the molecular weight characteristics of the polymer. The polyesters of the invention also may be a miscible blend of a substantially amorphous polyester with a more crystalline polyester, combined in the proportions necessary to achieve a crystallization half time of at least 5 minutes. In a preferred embodiment, however, the polyesters of our invention are not blends.

The crystallization half time of the polyester, as used herein, may be measured using methods well-known to persons of skill in the art. For example, the crystallization half time may be measured using a Perkin-Elmer Model DSC-2 differential scanning calorimeter. The crystallization half time is measured from the molten state using the following procedure: a 15.0 mg sample of the polyester is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The crystallization half time is determined as the time span from reaching the isothermal crystallization temperature to the point of a crystallization peak on the DSC curve.

The polyester may comprise (i) at least 80 mole percent (mole %) of diacid residues comprising one or more of: terephthalic acid, naphthalenedicarboxylic acid, 1,4-cyclohexanedicarboxylic acid, or isophthalic acid; and (ii) diol residues comprising about 10 to about 100 mole % 1,4-cyclohexanedimethanol and 0 to about 90 mole % of one or more diols containing 2 to about 20 carbon atoms, wherein the diacid residues are based on 100 mole % and the diol residues are based on 100 mole %. Any of the various isomers of naphthalenedicarboxylic acid or mixtures of isomers may be used, but the 1,4-, 1,5-, 2,6-, and 2,7-isomers are preferred. Also, cycloaliphatic dicarboxylic acids such as, for example, 1,4-cyclohexanedicarboxylic acid may be present at the pure cis or trans isomer or as a mixture of cis and trans isomers. In one embodiment, for example, the polyester may comprise about 80 to about 100 mole % of diacid residues from terephthalic acid and 0 to about 20 mole % diacid residues from isophthalic acid.

The polyester may also further comprise from 0 to about 20 mole percent of one or more modifying diacids containing about 4 to about 40 carbon atoms. Examples of modifying dicarboxylic acids that may be used include aliphatic dicarboxylic acids, alicyclic dicarboxylic acids, aromatic dicarboxylic acids, or mixtures of two or more of these acids. Specific examples of modifying dicarboxylic acids include, but are not limited to, one or more of succinic acid, glutaric acid, adipic acid, suberic acid, sebacic acid, azelaic acid, dimer acid, or sulfoisophthalic acid. Additional examples of modifying diacarboxylic acids are fumaric; maleic; itaconic; 1,3-cyclohexanedicarboxylic; diglycolic; 2,5-norbornanedicarboxylic; phthalic; diphenic; 4,4'-oxydibenzoic; and 4,4'-sulfonyldibenzoic.

The diol residues may comprise about 10 to about 100 mole % 1,4-cyclohexanedimethanol and 0 to about 90 mole % of one or more diols containing 2 to about 20 carbon atoms. As used herein, the term "diol" is synonymous with the term "glycol" and means any dihydric alcohol. Examples of diols include ethylene glycol; diethylene glycol; triethylene glycol; polyethylene glycols; 1,2-propanediol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; neopentyl glycol; 1,6-hexanediol; 1,8-octanediol; 2,2,4-trimethyl-1,3-pentanediol; thiodiethanol; 1,2-cyclohexanedimethanol; 1,3-cyclohexane-dimethanol; 2,2,4,4-tetramethyl-1,3-cyclobutanediol; p-xylylenediol; bisphenol A; bisphenol S; polyalkylene glycol; or combinations of one or more of these glycols. The cycloaliphatic diols, for example, 1,3- and 1,4-cyclohexanedimethanol, may be present as their pure cis or trans isomers or as a mixture of cis and trans isomers. In another example, the diol residues may comprise about 10 to about 100 mole percent 1,4-cyclohexanedimethanol and 0 to about 90 mole % ethylene glycol. In yet another example, the diol residues may comprise about 20 to about 70 mole percent 1,4-cyclohexanedimethanol and about 80 to about 30 mole percent ethylene glycol.

The polyester composition of the instant invention has a glass transition temperature, abbreviated herein as "Tg", ranging from about −45° C. to about 40° C., as measured using standard techniques well known to persons skilled in the art such as, for example, differential scanning calorimetry ("DSC"). The Tg measurements are typically conducted using a "dry polymer", that is, a polymer sample in which adventitious or absorbed water is driven off by heating the polymer to a temperature of about 200° C. and allowing the sample to return to room temperature. Usually, the polyester composition is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement. Typically, the polyester composition has a Tg of 30° C. or less. Further examples of glass transition temperatures exhibited by the polyester composition are 25° C. or less, 20° C. or less, 10° C. or less, and 0° C. or less.

The inherent viscosity, abbreviated herein as "I.V.", of the polyesters of the invention generally ranges from about 0.4 to about 1.2 dL/g and, preferably, about 0.5 to about 1.0 dL/g. The term I.V. refers to inherent viscosity determinations made at 25° C. using 0.25 gram of polymer per 50 mL of a solvent composed of 60 weight percent phenol and 40 weight percent tetrachloroethane.

The polyesters of the instant invention are readily prepared from the appropriate dicarboxylic acids, esters, anhydrides, or salts, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters of the present invention are prepared by procedures known to persons skilled in the art. The reaction of the diol component and the dicarboxylic acid component may be carried out using conventional polyester polymerization conditions. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and most preferably about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight, linear or branched polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The polyester composition also comprises a plasticizer. The presence of the plasticizer is useful to produce flexible materials having good mechanical properties. The plasticizer also helps to lower the processing temperature of the polyester and may help to prevent sticking of the polyester composition to the calender rolls. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. In another embodiment, the preferred plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers and their solubilities as determined by the above test are set forth in Table 1. A value of 4 or greater over the temperature indicates that this plasticizer is candidate for use in the present invention.

TABLE 1

Solubilities of Plasticizers

| | TEMPERATURE (° C.) | | | | | |
|---|---|---|---|---|---|---|
| | 23 | 75 | 100 | 140 | 150 | 160 |
| Adipic Acid Derivatives | | | | | | |
| Dicapryl adipate | 1 | 1 | 1 | 1 | 2 | 2 |
| Di-(2-ethylhexyl adipate) | 1 | 1 | 1 | 1 | 2 | 2 |
| Di(n-heptyl, n-nonyl) adipate | 1 | 1 | 1 | 1 | 2 | 2 |

TABLE 1-continued

Solubilities of Plasticizers

| | TEMPERATURE (° C.) | | | | | |
|---|---|---|---|---|---|---|
| | 23 | 75 | 100 | 140 | 150 | 160 |
| Diisobutyl adipate | 1 | 3 | 3 | 3 | 3 | 4 |
| Diisodecyl adipate | 1 | 1 | 1 | 1 | 1 | 1 |
| Dinonyl adipate | 1 | 1 | 1 | 1 | 1 | 2 |
| Di-(tridecyl) adipate | 1 | 1 | 1 | 1 | 1 | 1 |
| Azelaic Acid Derivatives | | | | | | |
| Di-(2-ethylhexyl azelate) | 1 | 1 | 1 | 1 | 2 | 2 |
| Diisodecyl azelate | 1 | 1 | 1 | 1 | 1 | 1 |
| Diisoctyl azealate | 1 | 1 | 1 | 1 | 2 | 2 |
| Dimethyl azelate | 3 | 4 | 4 | 4 | 4 | 6 |
| Di-n-hexyl azelate | 1 | 1 | 2 | 2 | 3 | 3 |
| Benzoic Acid Derivatives | | | | | | |
| Diethylene glycol dibenzoate (DEGDB) | 4 | 4 | 4 | 6 | 6 | 6 |
| Dipropylene glycol dibenzoate | 3 | 3 | 4 | 4 | 4 | 6 |
| Propylene glycol dibenzoate | 1 | 3 | 4 | 6 | 6 | 6 |
| Polyethylene glycol 200 dibenzoate | 4 | 4 | 4 | 6 | 6 | 6 |
| Neopentyl glycol dibenzoate | 0 | 3 | 3 | 3 | 4 | 6 |
| Citric Acid Derivatives | | | | | | |
| Acetyl tri-n-butyl citrate | 1 | 1 | 1 | 2 | 3 | 3 |
| Acetyl triethyl citrate | 1 | 2 | 2 | 2 | 3 | 3 |
| Tri-n-Butyl citrate | 1 | 2 | 3 | 3 | 3 | 3 |
| Triethyl citrate | 3 | 3 | 3 | 3 | 3 | 3 |
| Dimer Acid Derivatives | | | | | | |
| Bis-(2-hydroxyethyl dimerate) | 1 | 1 | 1 | 1 | 2 | 3 |
| Epoxy Derivatives | | | | | | |
| Epoxidized linseed oil | 1 | 2 | 2 | 2 | 3 | 3 |
| Epoxidized soy bean oil | 1 | 1 | 1 | 1 | 1 | 2 |
| 2-Ethylhexyl epoxytallate | 1 | 1 | 1 | 1 | 3 | 3 |
| Fumaric Acid Derivatives | | | | | | |
| Dibutyl fumarate | 2 | 2 | 3 | 3 | 3 | 3 |
| Glycerol Derivatives | | | | | | |
| Glycerol Tribenzoate | 0 | 0 | 6 | 6 | 6 | 6 |
| Glycerol triacetate | 2 | 3 | 3 | 3 | 3 | 4 |
| Glycerol diacetate monolaurate | 1 | 2 | 2 | 2 | 2 | 4 |
| Isobutyrate Derivative | | | | | | |
| 2,2,4-Trimethyl-1,3-pentanediol, Diisobutyrate | 1 | 1 | 1 | 1 | 3 | 3 |
| Texanol diisobutyrate | 1 | 2 | 2 | 2 | 2 | 4 |
| Isophthalic Acid Derivatives | | | | | | |
| Dimethyl isophthalate | 0 | 5 | 5 | 6 | 6 | 6 |
| Diphenyl isophthalate | 0 | 0 | 0 | 0 | 0 | 0 |
| Di-n-butylphthalate | 2 | 3 | 3 | 3 | 3 | 3 |
| Lauric Acid Derivatives | | | | | | |
| Methyl laurate | 1 | 2 | 3 | 3 | 3 | 3 |
| Linoleic Acid Derivative | | | | | | |
| Methyl linoleate, 75% | 1 | 1 | 2 | 3 | 3 | 3 |
| Maleic Acid Derivatives | | | | | | |
| Di-(2-ethylhexyl) maleate | 1 | 1 | 2 | 3 | 3 | 3 |
| Di-n-butyl maleate | 2 | 3 | 3 | 3 | 3 | 3 |
| Mellitates | | | | | | |
| Tricapryl trimellitate | 1 | 1 | 1 | 1 | 1 | 1 |
| Triisodecyl trimellitate | 1 | 1 | 1 | 1 | 1 | 1 |
| Tri-(n-octyl,n-decyl) trimellitate | 1 | 1 | 1 | 1 | 1 | 1 |
| Triisonyl trimellitate | 1 | 1 | 1 | 1 | 1 | 1 |
| Myristic Acid Derivatives | | | | | | |
| Isopropyl myristate | 1 | 1 | 1 | 2 | 3 | 3 |
| Oleic Acid Derivatives | | | | | | |
| Butyl oleate | 1 | 1 | 1 | 2 | 3 | 3 |
| Glycerol monooleate | 0 | 1 | 1 | 1 | 3 | 3 |
| Glycerol trioleate | 1 | 1 | 1 | 1 | 2 | 2 |
| Methyl oleate | 1 | 1 | 2 | 2 | 3 | 3 |
| n-Propyl oleate | 1 | 1 | 1 | 2 | 3 | 3 |
| Tetrahydrofurfuryl oleate | 1 | 1 | 1 | 2 | 3 | 3 |
| Palmitic Acid Derivatives | | | | | | |
| Isopropyl palmitate | 1 | 1 | 1 | 1 | 2 | 3 |
| Methyl palmitate | 0 | 1 | 1 | 2 | 3 | 3 |
| Paraffin Derivatives | | | | | | |
| Chloroparaffin, 41% C1 | 1 | 1 | 2 | 2 | 2 | 3 |
| Chloroparaffin, 50% C1 | 1 | 2 | 3 | 3 | 3 | 3 |
| Chloroparaffin, 60% C1 | 1 | 5 | 6 | 6 | 6 | 6 |
| Chloroparaffin, 70% C1 | 0 | 0 | 0 | 0 | 0 | 0 |
| Phosphoric Acid Derivatives | | | | | | |
| 2-Ethylhexyl diphenyl phosphate | 2 | 3 | 3 | 3 | 4 | 4 |
| Isodecyl diphenyl phosphate | 1 | 2 | 3 | 3 | 3 | 3 |
| t-Butylphenyl diphenyl phosphate | 1 | 3 | 3 | 4 | 6 | 6 |
| Resorcinol bis(diphenyl phosphate) (RDP) 100% RDP | 1 | 1 | 1 | 3 | 3 | 3 |
| Blend of 75% RDP, 25% DEGDB (by wt) | 1 | 2 | 2 | 4 | 4 | 5 |
| Blend of 50% RDP, 50% DEGDB (by wt) | 1 | 2 | 5 | 6 | 6 | 6 |
| Blend of 25% RDP, 75% DEGDB (by wt) | 1 | 3 | 3 | 6 | 6 | 6 |
| Tri-butoxyethyl phosphate | 1 | 2 | 3 | 4 | 4 | 4 |
| Tributyl phosphate | 2 | 3 | 3 | 3 | 3 | 3 |
| Tricresyl phosphate | 1 | 3 | 3 | 4 | 6 | 6 |
| Triphenyl phosphate | 0 | 4 | 4 | 6 | 6 | 6 |
| Phthalic Acid Derivatives | | | | | | |
| Butyl benzyl phthalate | 2 | 3 | 3 | 6 | 6 | 6 |
| Texanol benzyl phthalate | 2 | 2 | 2 | 2 | 2 | 4 |
| Butyl octyl phthalate | 1 | 1 | 2 | 2 | 3 | 3 |
| Dicapryl phthalate | 1 | 1 | 1 | 1 | 2 | 2 |
| Dicyclohexyl phthalate | 0 | 1 | 2 | 2 | 4 | 5 |
| Di-(2-ethylhexyl) phthalate | 1 | 1 | 1 | 2 | 3 | 3 |
| Diethyl phthalate | 4 | 4 | 4 | 6 | 6 | 6 |
| Dihexyl phthalate | 1 | 2 | 3 | 3 | 3 | 3 |
| Diisobutyl phthalate | 1 | 3 | 3 | 3 | 3 | 5 |
| Diisodecyl phthalate | 1 | 1 | 1 | 1 | 2 | 2 |
| Diisoheptyl phthalate | 1 | 1 | 2 | 3 | 3 | 3 |
| Diisononyl phthalate | 1 | 1 | 1 | 1 | 2 | 3 |
| Diisooctyl phthalate | 1 | 1 | 2 | 2 | 3 | 3 |
| Dimethyl phthalate | 1 | 5 | 6 | 6 | 6 | 6 |
| Ditridecyl phthalate | 1 | 1 | 1 | 1 | 2 | 3 |
| Diundecyl phthalate | 1 | 1 | 1 | 2 | 2 | 2 |
| Ricinoleic Acid Derivatives | | | | | | |
| Butyl ricinoleate | 1 | 1 | 2 | 3 | 3 | 3 |
| Glycerol tri(acetyl) ricinoloeate | 1 | 1 | 1 | 2 | 1 | 1 |
| Methyl acetyl ricinoloeate | 1 | 1 | 2 | 3 | 3 | 3 |
| Methyl ricinoloeate | 1 | 2 | 3 | 3 | 3 | 4 |
| n-Butyl acetyl ricinoloeate | 1 | 1 | 1 | 2 | 3 | 3 |
| Propylene glycol ricinoloeate | 1 | 1 | 3 | 3 | 4 | 4 |
| Sebacic Acid Derivatives | | | | | | |
| Dibutyl sebacate | 1 | 2 | 3 | 3 | 3 | 3 |
| Di-(2-ethylhexyl) sebacate | 1 | 1 | 1 | 2 | 2 | 3 |
| Dimethyl sebacate | 0 | 4 | 4 | 6 | 6 | 6 |
| Stearic Acid Derivatives | | | | | | |
| Ethylene glycol monostearate | 0 | 1 | 2 | 3 | 3 | 3 |
| Glycerol monostearate | 0 | 0 | 1 | 2 | 2 | 2 |
| Isopropyl isostearate | 3 | 3 | 3 | 6 | 6 | 6 |
| Methyl stearate | 0 | 1 | 2 | 2 | 3 | 3 |
| n-Butyl stearate | 1 | 1 | 2 | 3 | 3 | 3 |
| Propylene glycol monostearate | 0 | 1 | 1 | 2 | 2 | 3 |
| Succinic Acid Derivatives | | | | | | |

TABLE 1-continued

Solubilities of Plasticizers

| | TEMPERATURE (° C.) | | | | | |
|---|---|---|---|---|---|---|
| | 23 | 75 | 100 | 140 | 150 | 160 |
| Diethyl succinate | 3 | 3 | 4 | 5 | 6 | 6 |
| Sulfonic Acid Derivatives | | | | | | |
| N-Ethyl o,p-toluenesulfonamide | 2 | 5 | 6 | 6 | 6 | 6 |
| o,p-toluenesulfonamide | 0 | 0 | 0 | 6 | 6 | 6 |

Key:
0 = Plasticizer is a solid at this temperature
1 = Plasticizer is liquid, yet nothing happening to the film
2 = film has begun to haze
3 = film has swollen
4 = film has begun to change as disintegrating off and/or liquid becoming hazy
5 = no longer a film, liquid is hazy
6 = liquid is clear A similar test to that above is described in "The Technology of Plasticizers", by J. Kern Sears and Joseph R. Darby, published by Society of Plastic Engineers/Wiley and Sons, New York, 1982, pp 136-137. In this test, a grain of the polymer is placed in a drop of plasticizer on a heated microscope stage. If the polymer disappears, then it is solubilized. The plasticizers that are most effective at solubilizing the polyester of the instant invention have a solubility of greater than 4 according to Table 1 and can also be classified according to their solubility parameter. The solubility parameter, or square root of the cohesive energy density, of a plasticizer can be calculated by the method described by Coleman et al., *Polymer* 31, 1187 (1990). The most preferred plasticizers will have a solubility parameter ($\delta$) in the range of about 9.5 to about 13.0 $cal^{0.5}\ cm^{-1.5}$. It is generally understood that the solubility parameter of the plasticizer should be within 1.5 units of the solubility parameter of polyester. The data of Table 2 shows that plasticizers with a solubility parameter within this range solubilize the polyester while those plasticizers with a solubility parameter outside of this range are less effective.

TABLE 2

| Plasticizer | $\delta$ ($cal^{0.5}\ cm^{-1.5}$) | Solubility @ 160° C. from Table 1 |
|---|---|---|
| Glycerol diacetate monolaurate | 8.1 | 4 |
| Texanol diisobutyrate | 8.4 | 4 |
| Di-2-ethylhexyladipate | 8.5 | 2 |
| Trioctyltrimellitate | 8.8 | 1 |
| Di-2-ethylhexylphthalate | 8.9 | 2 |
| Texanol benzyl phthalate | 9.5 | 4 |
| Neopentyl glycol dibenzoate | 9.8 | 6 |
| Dipropylene glycol dibenzoate | 10.0 | 6 |
| Butyl benzyl phthalate | 10.1 | 6 |
| Propylene glycol dibenzoate | 10.3 | 6 |
| Diethylene glycol dibenzoate | 10.3 | 6 |
| Glycerol tribenzoate | 10.6 | 6 |

In general, higher molecular weight plasticizers are preferred to prevent smoking and loss of plasticizer during the calendering process. The preferred range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polyester composition that may be calendered satisfactorily also decreases. Typically, the plasticizer comprises from about 5 to about 50 weight percent (wt %) of the polyester composition based on the total weight of the polyester composition. Other examples of plasticizer levels are about 10 to about 40 wt %, about 15 to about 40 wt %, and about 15 to about 30 wt % of the polyester composition.

Examples of plasticizers which may be used according to the invention are esters comprising: (i) an acid residue comprising one or more of: phthalic acid, adipic acid, trimellitic acid, benzoic acid, azelaic acid, terephthalic acid, isophthalic acid, butyric acid, glutaric acid, citric acid or phosphoric acid; and (ii) an alcohol residue comprising one or more aliphatic, cycloaliphatic, or aromatic alcohols containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB".

The polyester composition also comprises a phosphorus-containing flame retardant. The phosphorus-containing flame retardant is miscible with the plasticized polyester. The term "miscible", as used herein," is understood to mean that the flame retardant and the plasticized polyester will mix together to form a stable mixture which will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. Preferably, the phosphorus-containing compound is a non-halogenated, organic compound such as, for example, a phosphorus acid ester containing organic substituents. The flame retardant may comprise a wide range of phosphorus compounds well-known in the art such as, for example, phosphines, phosphites, phosphinites, phosphonites, phosphinates, phosphonates, phosphine oxides, and phosphates. Examples of phosphorus-containing flame retardants include tributyl phosphate, triethyl phosphate, tributoxyethyl phosphate, t-Butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to: dibenzyl phosphoric acid, dibutyl phosphoric acid, di(2-ethylhexyl)phosphoric acid, diphenyl phosphoric acid, methyl phenyl phosphoric acid, phenyl benzyl phosphoric acid, hexylphosphonic acid, phenylphosphonic acid tolylphosphonic acid, benzylphosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more monoesters, diesters, or triesters of phosphoric acid. In another example, the flame retardant comprises resorcinol bis(diphenyl phosphate), abbreviated herein as "RDP".

The flame retardant may be added to the polyester composition at a concentration of about 5 wt % to about 40 wt % based on the total weight of the polyester composition. Other examples of the flame retardant levels are about 7 wt % to about 35 wt %, about 10 wt % to about 30 wt %, and about 10 wt % to about 25 wt %. The flame retardant polyester compositions of the present invention typically give a V2 or greater rating in a UL94 burn test. In addition, our flame retardant polyester compositions typically give a burn rate of 0 in the Federal Motor Vehicle Safety Standard 302 (typically referred to as FMVSS 302).

The phosphorus-containing flame retardant may also function as a plasticizer for the polyester. In this embodiment, the flame retardant may be substituted for a portion or all of the plasticizer component of the polyester composition, depending on the flame retardant's effectiveness as a plasticizer. Typically, when a plasticizing flame retardant is used, the amount of flame retardant need to achieve the desired burn rate or flame resistance of the calendered film or sheet is determined first, then the amount of plasticizer needed to produce the desired Tg of the film or sheet is adjusted.

A preferred embodiment of the instant invention is a flame retardant polyester composition for calendering, comprising:
(a) a polyester having a crystallization half time from a molten state of at least 10 minutes wherein the polyester is a random copolymer comprising (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 20 to about 40 mole percent 1,4-cyclohexanedimethanol and about 60 to about 80 mole percent of one or more diols containing 2 to about 20 carbon atoms, wherein the diacid residues are based on 100 mole percent and the diol residues are based on 100 mole percent;
(b) about 10 wt % to about 40 wt % of plasticizer comprising one or more benzoates, phthalates, phosphates, or isophthalates;
(c) about 5 wt % to about 40 wt % of a phosphorus-containing flame retardant miscible with the polyester plasticized with the plasticizer; and
(d) an additive effective to prevent sticking of the polyester to calendering rolls, wherein the wt % is based upon the total weight of the polyester composition. Any of the various isomers of naphthalenedicarboxylic acid or mixtures of isomers may be used, but the 1,4-, 1,5-, 2,6-, and 2,7-isomers are preferred. Also, 1,4-cyclohexanedicarboxylic acid may be present at the pure cis or trans isomer or as a mixture of cis and trans isomers. The diols, modifying diacids, and flame retardants are as described previously. The preferred plasticizer comprises one or more benzoates, phthalates, phosphates, or isophthalates, such as listed, for example, in Table 1. Examples of preferred plasticizers include, but are not limited to, neopentyl glycol dibenzoate, diethylene glycol dibenzoate, butyl benzyl phthalate; and texanol benzyl phthalate. Most preferably, the plasticizer comprises diethylene glycol dibenzoate and the flame retardant comprises resorcinol bis(diphenyl phosphate).

In addition to the polyester, the polyester compositions described above comprise an additive that is effective to prevent sticking of the polyester to the calendering rolls. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 wt % based on the total weight percent of the polyester composition. The optimum amount of additive used is determined by factors well known in the art and is dependent upon variations in equipment, material, process conditions, and film thickness. Examples of additives of the present invention include fatty acid amides such as erucylamide and stearamide; metal salts of organic acids such as calcium stearate and zinc stearate; fatty acids, fatty acid salts, and fatty acid esters such as stearic acid, oleic acid, and palmitic acid; hydrocarbon waxes such as paraffin wax, phosphoric acid esters, polyethylene waxes, and polypropylene waxes; chemically modified polyolefin waxes; ester waxes such as carnauba wax; metal salts fin waxes; glycerin esters such as glycerol mono- and distearates; talc; microcrystalline silica; and acrylic copolymers (for example, PARALOID® K175 available from Rohm & Haas). The preferred additive comprises erucylamide, stearamide, calcium stearate, zinc stearate, stearic acid, oleic acid, palmitic acid, paraffin wax, polyethylene waxes, polypropylene waxes, carnauba wax, glycerol monostearate, and glycerol distearate. More preferably, the amount of additive in the polyester composition is about 0.1 to about 2 wt %.

A preferred additive comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms have a lower molecular weight and, thus, become miscible with the polyester. Such miscible additives have less interfacial migration surface qualities resulting in poor release or an increase in haze. In another example, the ratio of the fatty acid or salt of the fatty acid to the ester wax is 2:1 or greater.

The fatty acid may comprise montanic acid in which the salt of the fatty acid may comprise one or more of: the sodium salt of montanic acid, the calcium salt of montanic acid, or the lithium salt of montanic acid. The fatty acid residue of the ester wax may comprise montanic acid. The alcohol residue of the ester wax preferably contains 2 to 28 carbon atoms. Examples of alcohols include montanyl alcohol, ethylene glycol, butylene glycol, glycerol, and pentaerythritol. The additive may also comprise an ester wax which has been partially saponified with a base such as, for example, calcium hydroxide.

Oxidative stabilizers also may be used with polyesters of the present invention to prevent oxidative degradation during processing of the molten or semi-molten material on the rolls. Such stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as IRGAFOS® available from Ciba-Geigy AG and WESTON® stabilizers available from GE Specialty Chemicals. These stabilizers may be used alone or in combinations.

In the event that the melt viscosity and the melt strength of the polyester are insufficient for suitable processing on the calendering equipment, a melt strength enhancer may be used. Typically, melt strength may be increased by the addition of small amounts (about 0.1 to about 2.0 mole %) of a branching agent to the polyesters either during their initial preparation or during subsequent blending or feeding procedures prior to reaching the calendering equipment. Suitable branching agents include multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. These branching agents may be added directly to the polyester or blended with the polyester in the form of a concentrate as described in U.S. Pat. No. 5,654,347 and U.S. Pat. No. 5,696,176. It is also possible to use agents such as sulfoisophthalic acid to increase the melt strength of the polyester to a desirable level. In addition, the polyester compositions may contain dyes, pigments, fillers, matting agents, antiblocking agents, antistatic agents, blowing agents, chopped fibers, glass, impact modifiers, carbon black, talc, $TiO_2$ and the like as desired. Colorants, sometimes referred to as toners, may be added to impart a desired neutral hue and/or brightness to the polyester and the calendered product.

The components of the polyester composition may be blended in batch, semicontinuous, or continuous processes. Small scale batches may be readily prepared in any high-intensity mixing devices well-known to those skilled in the art, such as Banbury mixers, prior calendering. The components also may be blended in solution in an appropriate solvent. The melt blending method includes blending the polyester, plasticizer, flame retardant, additive, and any additional components at a temperature sufficient to melt the polyester. The blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the polyester mixture during the reaction of the diol and the dicarboxylic acid or they may be melt blended with the preformed polyester. A preferred method of including colorants is to use a colorant having thermally stable organic colored compounds having reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after an ester interchange or direct esterification reaction.

The instant invention also provides a process for a flame retardant film or a sheet, comprising: calendering a polyester composition comprising (a) a polyester having a crystallization half time from a molten state of at least 5 minutes, wherein the polyester is a random copolymer; (b) a plasticizer; (c) a phosphorus-containing flame retardant miscible with the polyester plasticized with the plasticizer; and (d) an additive effective to prevent sticking of the polyester to calendering rolls. The polyesters, plasticizers, flame retardants, and additives are as described hereinabove for the other embodiments of the invention. The polyester, which is a random copolymer, has a crystallization half time of at least 5 minutes. The crystallization half time may be, for example, greater than 7 minutes, greater than 10 minutes, greater than 12 minutes, greater than 20 minutes, greater than 100 minutes, and greater than 300 minutes. The film or sheet of the instant invention has a Tg ranging from about −45° C. to about 40° C. Typically, the film or sheet has a Tg of 30° C. or less. Further examples of glass transition temperatures exhibited by the film or sheet are 25° C. or less, 20° C. or less, 10° C. or less, and 0° C. or less.

The preferred plasticizer comprises one or more aromatic rings and, more preferably, comprises one or more benzoates, phthalates, phosphates, or isophthalates, such as listed, for example, in Table 1. Examples of plasticizers include, but are not limited to, neopentyl glycol dibenzoate, diethylene glycol dibenzoate, butyl benzyl phthalate; and texanol benzyl phthalate. Typically, the plasticizer comprises from about 5 to about 50 weight percent (wt %) of the polyester composition based on the total weight of the polyester composition. Other examples of plasticizer levels are about 10 to about 40 wt %, about 15 to about 40 wt %, and about 15 to about 30 wt % of the polyester composition.

The flame retardant may be added to the polyester composition at a concentration of about 5 wt % to about 40 wt % based on the total weight of the polyester composition. Other examples of the flame retardant levels are about 7 wt % to about 35 wt %, about 10 wt % to about 30 wt %, and about 10 wt % to about 25 wt %. Preferably, the flame retardant comprises one or more monoesters, diesters, or triesters of phosphoric acid. The phosphorus-containing flame retardant may also function as a plasticizer for the polyester. In another example, the plasticizer comprises diethylene glycol dibenzoate and the flame retardant comprises resorcinol bis(diphenyl phosphate). The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

Preferred additives comprise about 0.1 wt % to about 10 wt %, based on the total weight of the polyester composition, of one or more fatty acid amides, metal salts of organic acids, fatty acids, fatty acid esters, hydrocarbon waxes, phosphoric acid esters, chemically modified polyolefin waxes, glycerin esters, talc, or acrylic copolymers. In addition, the additive may comprise (i) a fatty acid or a salt of a fatty acid containing more than 18 carbon atoms and (ii) an ester wax comprising a fatty acid residue containing more than 18 carbon atoms and an alcohol residue containing from 2 to 28 carbon atoms. Preferably, the ratio of the fatty acid or salt of the fatty acid to the ester wax is 1:1 or greater. The preferred fatty acid comprises montanic acid and the preferred salt of the fatty acid comprises one or more of: the sodium salt of montanic acid, the calcium salt of montanic acid, or the lithium salt of montanic acid. In addition, the preferred fatty acid residue of the ester wax comprises montanic acid.

Conventional calendering processes and equipment are utilized to calender the polyester composition. In the process of the invention, polyester composition may comprise a molten, pellet or powder form and is passed through a compressive nip between at least two calendering rolls at temperatures of about 100° C. to about 200° C. Typically, the polyester is blended with the plasticizer, flame retardants, additive, and other components. The mixed ingredients are plasticized in a kneader or extruder. Through heat, shearing, and pressure, the dry powders are fused to form a homogeneous, molten material. The extruder feeds the molten material in a continuous process to the top of the calendering section of the calendering line in between first and second heated calender rolls. Typically, four rolls are used to form three nips or gaps. For example, the rolls may be configured in an "L" shape, an inverted "L" shape", or a "Z" configuration. The rolls vary in size to accommodate different film widths. The rolls have separate temperature and speed controls. The material proceeds through the nip between the first two rolls, referred to as the feed nip. The rolls rotate in opposite directions to help spread the material across the width of the rolls. The material winds between the first and second, second and third, third and fourth rolls, etc. The gap between rolls decreases in thickness between each of the rolls so that the material is thinned between the sets of rolls as it proceeds. Typical processing temperatures for the rolls will generally range from about 80° C. to about 220° C., preferably about 100° C. to about 200° C., and more preferably about 130° C. to about 180° C. For some hydrolytically unstable polyesters, predrying the polyester resin composition or venting excess moisture during processing is desirable to prevent polymer degradation by hydrolysis. After passing through the calender section, the material moves through another series of rolls where it is stretched and gradually cooled forming a film or sheet. The material also may be embossed or annealed before cooling. The cooled material is then wound onto master rolls. General descriptions of calendering processes are disclosed in Jim Butschli, *Packaging World*, p. 26-28, June 1997 and W. V. Titow, *PVC Technology*, 4$^{th}$ Edition, pp 803-848 (1984), Elsevier Publishing Co.

The resulting film or sheet made from the polyester composition of the present invention has a uniform thickness that is produced by passing the polyester resin composition through the compressive nips between the heated rolls. In effect, the polyester resin composition is squeezed between the nips which separate the rolls. Each successive nip between the calendering rolls reduces in opening size to obtain the final film or sheet gauge.

The invention further includes a flame retardant film or sheet comprising a polyester composition, the polyester composition comprising (a) a polyester having a crystallization half time from a molten state of at least 5 minutes, wherein the polyester is a random copolymer; (b) a plasticizer; (c) an phosphorus-containing flame retardant miscible with the polyester plasticized with the plasticizer; and (d) an additive effective to prevent sticking of the polyester to calendering rolls wherein the film or sheet is prepared by calendering the polyester composition. The polyesters, plasticizers, flame retardants, and additives are as described hereinabove for the other embodiments of the invention. The polyester, which is a random copolymer, has a crystallization half time of at least 5 minutes. The crystallization half time may be, for example, greater than 7 minutes, greater than 10 minutes, greater than 12 minutes, greater than 20 minutes, greater than 100 minutes, and greater than 300 minutes. The film or sheet preferably has a Tg of 30° C. or less. Further examples of glass transition temperatures exhibited by the polyester composition are 25° C. or less, 20° C. or less, 10° C. or less, and 0° C. or less. The preferred plasticizer comprises one or more aromatic rings and, more preferably, comprises one or more benzoates, phthalates, phosphates, or isophthalates, such as listed, for example, in Table 1. Examples of plasticizers include, but are not limited to, neopentyl glycol dibenzoate, diethylene glycol dibenzoate, butyl benzyl phthalate; and texanol benzyl phthalate. Typically, the plasticizer comprises from about 5 to about 50 weight percent (wt %) of the polyester composition based on the total weight of the polyester composition. Other examples of plasticizer levels are about 10 to about 40 wt %, about 15 to about 40 wt %, and about 15 to about 30 wt % of the polyester composition.

The flame retardant may be added to the polyester composition at a concentration of about 5 wt % to about 40 wt % based on the total weight of the polyester composition. Other examples of the flame retardant levels are about 7 wt % to about 35 wt %, about 10 wt % to about 30 wt %, and about 10 wt % to about 25 wt %. Preferably, the flame retardant comprises one or more monoesters, diesters, or triesters of phosphoric acid. The phosphorus-containing flame retardant may also function as a plasticizer for the polyester. Most preferably, the plasticizer comprises diethylene glycol dibenzoate and the flame retardant comprises resorcinol bis(diphenyl phosphate). The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

Preferred additives comprise about 0.1 wt % to about 10 wt %, based on the total weight of the polyester composition, of one or more fatty acid amides, metal salts of organic acids, fatty acids, fatty acid salts, fatty acid esters, hydrocarbon waxes, phosphoric acid esters, chemically modified polyolefin waxes, ester waxes, glycerin esters, talc, or acrylic copolymers. In addition, the additive may comprise (i) a fatty acid or a salt of a fatty acid containing more than 18 carbon atoms and (ii) an ester wax comprising a fatty acid residue containing more than 18 carbon atoms and an alcohol residue containing from 2 to 28 carbon atoms. Preferably, the ratio of the fatty acid or salt of the fatty acid to the ester wax is 1:1 or greater. The fatty acid preferably comprises montanic acid and the salt of the fatty acid preferably comprises one or more of: the sodium salt of montanic acid, the calcium salt of montanic acid, or the lithium salt of montanic acid. The fatty acid residue of the ester wax preferably comprises montanic acid.

In addition to the embodiments described above, the instant invention also provides a flame retardant polyester composition for calendering in which the inclusion of an additive to prevent sticking of the polyester composition to the calender rolls is optional. Thus, the invention provides a flame retardant polyester composition for calendering, comprising: (a) about 50 to about 95 weight percent of a polyester having a melting temperature of less than 220° C. and exhibiting more than 1 percent crystallinity after annealing for 2000 minutes at a temperature at which the polyester has a maximum crystallization rate, wherein the polyester is a random copolymer; (b) about 5 to about 50 wt % of a plasticizer miscible with the polyester, based on the total weight of the polyester composition; and (c) a phosphorus-containing flame retardant miscible with the polyester plasticized with the plasticizer. The polyesters, plasticizers, and flame retardants are as described hereinabove. The polyester may be a random copolymer having a melting temperature of less than 220° C. and exhibiting more than 1 percent crystallinity after annealing for 2000 minutes at a temperature at which the polyester has a maximum crystallization rate. The percent crystallinity of the polyester may be determined by comparing the heat of fusion of the polyester, as determined by differential scanning calorimetry, against a 100% crystalline poly(ethylene) terephthalate reference value of 29 cal/g. the maximum crystallization rate for the polyester may be calculated or determined experimentally by DSC using methods well known to persons skilled in the art. Typically, the crystallization half time of the polyester is greater than 5 minutes; other examples of crystallization half times which may be exhibited by the polyester are greater than 7 minutes, greater than 10 minutes, greater than 12 minutes, greater than 20 minutes, greater than 100 minutes, and greater than 300 minutes. The polyester composition preferably has a Tg of 30° C. or less. Further examples of glass transition temperatures exhibited by the polyester composition are 25° C. or less, 20° C. or less, 10° C. or less, and 0° C. or less.

The polyester composition may comprise about 5 to about 50 wt % of a plasticizer miscible with the polyester, about 10 wt % to about 40 wt %, or about 15 to about 40 wt %. The preferred plasticizer comprises one or more aromatic rings and, more preferably, comprises one or more benzoates, phthalates, phosphates, or isophthalates, such as listed, for example, in Table 1. Examples of plasticizers include, but are not limited to, neopentyl glycol dibenzoate, diethylene glycol dibenzoate, butyl benzyl phthalate; and texanol benzyl phthalate.

The flame retardant may be added to the polyester composition at a concentration of about 5 wt % to about 40 wt % based on the total weight of the polyester composition. Other examples of the flame retardant levels are about 7 wt % to about 35 wt %, about 10 wt % to about 30 wt %, and about 10 wt % to about 25 wt %. Preferably, the flame retardant comprises one or more monoesters, diesters, or triesters of phosphoric acid. The phosphorus-containing flame retardant may also function as a plasticizer for the polyester. Most preferably, the plasticizer comprises diethylene glycol dibenzoate and the flame retardant comprises resorcinol bis(diphenyl phosphate). The polyester composition may optionally include an additive effective for preventing sticking of the polyester to the calender rolls. This additive has been described previously as part of the other embodiments of the instant invention. The flame retardant polyester composition will typically give a V2 or greater rating in a UL94 burn test. In addition, our flame retardant polyester compositions typically give a burn rate of 0 in the Federal Motor Vehicle Safety Standard 302 (typically referred to as FMVSS 302).

The polyester composition may be formed into a film or sheet by calendering the polymer composition and inducing crystallization either before or after the calendering process. Thus, another embodiment of the instant invention is a process for a flame retardant film or a sheet, comprising: (i) calendering a polyester composition comprising (a) about 50 to about 95 weight percent of a polyester having a melting temperature of less than 220° C. and exhibiting more than 1 percent crystallinity after annealing for 2000 minutes at a temperature at which the polyester has a maximum crystallization rate, wherein the polyester is a random copolymer; (b) about 5 to about 50 wt % of a plasticizer miscible with the polyester, based on the total weight of the polyester composition; and (c) a phosphorus-containing flame retardant miscible with the polyester plasticized with the plasticizer and (ii) inducing crystallization during step (i) or after step (i). Further, the invention includes the film or sheet prepared by the above process. Thus, another aspect of the invention is a flame retardant film or sheet, comprising: (a) about 50 to about 95 weight percent of a polyester having a melting temperature of less than 220° C. and exhibiting more than 1 percent crystallinity after annealing for 2000 minutes at a temperature at which the polyester has a maximum crystallization rate, wherein the polyester is a random copolymer; (b) about 5 to about 50 weight percent of a plasticizer miscible with the polyester; and (c) a phosphorus-containing flame retardant miscible with the polyester plasticized with the plasticizer. The polyesters, plasticizers, and flame retardants are as described hereinabove. The calendering process conditions are as described previously; the polyester composition typically comprises a molten, pellet or powder form and is passed through a compressive nip between at least two calendering rolls at temperatures of about 100° C. to about 200° C. The polyester is random copolymer and has a melting temperature of less than about 220° C. and exhibits more than about 1 percent crystallinity after annealing for 2000 minutes at a temperature at which the polyester has a maximum crystallization rate. Typically, the crystallization half time of the polyester is greater than 5 minutes; other examples of crystallization half times which may be exhibited by the polyester are greater than 7 minutes, greater than 10 minutes, greater than 12 minutes, greater than 20 minutes, greater than 100 minutes, and greater than 300 minutes. The film or sheet of the instant invention has a Tg ranging from about −45° C. to about 40° C., preferably 30° C. or less, and a melting temperature greater than about 120° C., preferably greater than about 140° C. Further examples of glass transition temperatures exhibited by the polyester are less than 25° C., less than 20° C., less than 10° C., and less than 0° C.

The polyester composition comprises about 5 to about 50 wt % of a plasticizer miscible with the polyester, preferably about 10 wt % to about 40 wt %, or more preferably from about 15 to about 40 wt %. The preferred plasticizer comprises one or more aromatic rings and may comprise, for example, one or more benzoates, phthalates, phosphates, or isophthalates, such as listed in Table 1. Examples of plasticizers include, but are not limited to, neopentyl glycol dibenzoate, diethylene glycol dibenzoate, butyl benzyl phthalate; and texanol benzyl phthalate.

The flame retardant may be added to the polyester composition at a concentration of about 5 wt % to about 40 wt % based on the total weight of the polyester composition. Other examples of the flame retardant levels are about 7 wt % to about 35 wt %, about 10 wt % to about 30 wt %, and about 10 wt % to about 25 wt %. The flame retardant may comprise one or more monoesters, diesters, or triesters of phosphoric acid. The phosphorus-containing flame retardant may also function as a plasticizer for the polyester. Most preferably, the plasticizer comprises diethylene glycol dibenzoate and the flame retardant comprises resorcinol bis(diphenyl phosphate). The polyester composition may optionally include an additive effective for preventing sticking of the polyester to the calender rolls. This additive has been described hereinabove as part of the other embodiments of the instant invention. The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

In step (ii) of the present invention, the polyester composition is calendered to form a film or sheet and crystallization is induced. Inducing crystallization may be done either during or after forming the calendering operation. In one embodiment, inducing crystallization occurs after calendering by stretching. In another embodiment, inducing crystallization occurs after calendering by annealing at a temperature greater than the glass transition temperature of the film and less than melting temperature of the base copolyester. In still another embodiment, forming of the film or sheet and inducing crystallization occur together during step (b) by calendering alone.

The invention is illustrated further by the following examples.

EXAMPLES

A general procedure for the preparation of a flame-retardant polyester composition and a process for calendering follows. Flame retardant polyester compositions were prepared by melt blending a pelletized polyester with a composition having 80 to 100 wt % terephthalic acid, 30 to 80 wt % ethylene glycol, and 20 to 70 wt % 1,4-cyclohexanedimethanol (Tsunami® Copolyester GS-2, available from Eastman Chemical Company) melt blended with a release additive concentrate (Tsunami® ADD2, available from Eastman Chemical Company, which contains about 15 wt % of a mixture of Montan waxes, available from Clariant Corporation, and pre-compounded into Tsunami® Copolyester GS-2). A plasticizer (diethyleneglycol dibenzoate or DEGDB, obtained from Velsicol Chemical Corporation), a phosphate ester flame retardant, and various fillers and colorants (such as, for example, a $TiO_2$ colorant concentrate, produced by Eastman Chemical Company) also were melt blended with the polyester to form a flexible polyester material which could be processed by calendering methods. It was not necessary to dry the polyester pellets for the experiment as earlier experiments had shown that hydrolysis of the polyester is not significant at the low melt temperatures used in this study. The mixing experiments were performed on a Haake-Buchler Rheocord® System 40 using a bowl charge of 375 grams and a bowl temperature of 130° C. The blade speed in the batch mixer was 100 rpm. For each example, a LabView® computer system was employed to record torque and temperature as a function of time. After the torque of the mixing bowl reached its peak value, the mixing was allowed to continue until the melt temperature reached 150° C. before the experiment was terminated and the contents of the mixing bowl were removed. Films were calendered on a Dr. Collin instrumented two roll mill. Because of the varied plasticization effects to the polymer system by the flame retardants, the processing roll set point temperature varied from 140 to 150° C. in order to have adequate melt strength and roll release for removal from the rolls.

The selection of DEGDB as a plasticizer was made based on its effectiveness to reduce Tg, copolyester compatibility, and clarity of the calendered material. Other plasticizers such as butyl benzyl phthalate, dipropyleneglycol dibenzoate, neopentyl glycol dibenzoate, propylene glycol dibenzoate and 2-ethyl hexyl-4-hydroxy benzoate may be used in this application.

Although examples 1-12 are for colored opaque formulations, the results are applicable to clear un-filled systems as well. It is possible also to add other flame-retardants to the system such as melamine polyphosphate, melamine cyanurate, magnesium hydroxide, aluminum trihydrate, and various other commercially available materials such as Flambloc® metaborate (available from Buckman Laboratories). Results are presented in Tables 3-7.

Examples 1-12

The composition and burn test results using resorcinol bis(diphenyl phosphate), "RDP", as the flame retardant are given in Table 3 and Table 4. Burn tests were conducted according to the UL94 burn test or the Federal Motor Vehicle Safety Standard 302 (typically referred to as FMVSS 302). Examples 1, 2, and 3 are white opaque formulations with calcium carbonate filler, and examples 4, 5, and 6 are white opaque formulations with kaolin filler. Examples 7, 8, and 9 are black opaque formulations with calcium carbonate filler, and examples 10, 11, and 12 are black opaque formulations with kaolin filler.

As can be seen from the data, the presence of RDP in the copolyester compositions reduced burn rates. The addition of RDP to the copolyester composition improved the burn ratings in the UL94 vertical burn test and reduced the burn rate in the FMVSS 302 horizontal burn test. Examples 1, 4, 7, and 10, contained no flame retardant. In these examples, a UL94 vertical burn rating of Fail was obtained and the horizontal burn rates were in the range of 40 to 50 mm/min. In examples 2, 5, 8 and 11, half of the DEGDB was replaced with RDP. In these examples, the horizontal burn rate decreased and the UL94 vertical burn test improved to a V2 rating. In examples 3, 6, 9 and 12, all of the DEGDB was replaced with RDP. In these examples, the UL94 test gave a V2 rating and the horizontal burn rate slowed significantly in comparison with examples containing less RDP.

TABLE 3

Flame Retardant Polyester Compositions
(White Opaque Formulations)

| | Example No. | | | | | |
|---|---|---|---|---|---|---|
| | 1 | 2 | 3 | 4 | 5 | 6 |
| Copolyester (wt %) | 57.8 | 57.8 | 57.8 | 57.8 | 57.8 | 57.8 |
| Montan wax release additive (wt %) | 0.9 | 0.9 | 0.9 | 0.9 | 0.9 | 0.9 |
| DEGDB (wt %) | 15.3 | 7.65 | 0 | 15.3 | 7.65 | 0 |
| $TiO_2$ (wt %) | 6 | 6 | 6 | 6 | 6 | 6 |
| Carbon Black (wt %) | | | | | | |
| $CaCO_3$ (wt %) | 20 | 20 | 20 | | | |

TABLE 3-continued

Flame Retardant Polyester Compositions
(White Opaque Formulations)

| | Example No. | | | | | |
|---|---|---|---|---|---|---|
| | 1 | 2 | 3 | 4 | 5 | 6 |
| Kaolin (wt %) | | | | 20 | 20 | 20 |
| RDP (wt %) | | 7.65 | 15.3 | | 7.65 | 15.3 |
| Vertical Burn Test Result (UL94) | Fail | V2 | V2 | Fail | V2 | V2 |
| Avg. Horiz. Burn Rate (FMVSS 302) | 42 | 36 | 11 | 40 | 2 | 0 |
| Tg ° C. of Polyester Composition | 22 | 27 | 39 | 19 | 27 | 37 |

TABLE 4

Flame Retardant Polyester Compositions
(Black Opaque Formulations)

| | Example No. | | | | | |
|---|---|---|---|---|---|---|
| | 7 | 8 | 9 | 10 | 11 | 12 |
| Copolyester (wt %) | 62.5 | 62.5 | 62.5 | 62.5 | 62.5 | 62.5 |
| Montan wax release additive (wt %) | 0.9 | 0.9 | 0.9 | 0.9 | 0.9 | 0.9 |
| DEGDB (wt %) | 15.6 | 7.8 | 0 | 15.6 | 7.8 | 0 |
| TiO$_2$ (wt %) | | | | | | |
| Carbon Black (wt %) | 1 | 1 | 1 | 1 | 1 | 1 |
| CaCO$_3$ (wt %) | 20 | 20 | 20 | | | |
| Kaolin (wt %) | | | | 20 | 20 | 20 |
| RDP (wt %) | | 7.8 | 15.6 | | 7.8 | 15.6 |
| Vertical Burn Test Result (UL94) | Fail | V2 | V2 | Fail | V2 | V2 |
| Avg. Horiz. Burn Rate (FMVSS 302) | 50 | 47 | 25 | 52 | 17 | No data obtained |
| Tg ° C. | 24 | 31 | 40 | 22 | 29 | 38 |

RDP also may be used to replace all or a portion of the plasticizer. The Tg of the materials increased as the DEGDB was replaced with RDP. The Tg of an unplasticized formulation is about 80° C. RDP can be used with both rigid and flexible formulations. RDP reduced Tg of the polyester composition but was less effective in comparison to DEGDB. In order to maintain the proper Tg of in a flexible formulation, additional DEGDB or other plasticizer typically will be required to be added back to the polyester composition. Table 5 shows the effect of the combination of DEGDB and RDP on the Tg of the polyester composition. The data of Table 5 is bracketed between a 1:1 replacement of DEGDB with RDP and the addition RDP to the formulation with no drop in the DEGDB level.

TABLE 5

Effect of DEGDB and RDP on Tg

| | | Tg of Composition, ° C. | | | | |
|---|---|---|---|---|---|---|
| DEGDB (wt %) | 20 | 22 | 16 | 11 | 10 | −3 |
| | 17.5 | | 23 | | | |
| | 15 | | | 26 | 21 | |
| | 10 | | | | 29 | 23 | 14 |
| | 5 | | | | | 36 | |
| | 0 | 80 | | | | | 38 |
| | | 0 | 5 | 10 | 15 | 20 |
| | | RDP (wt %) | | | | |

The actual levels required to maintain a Tg of less than or equal to room temperature are approximately equal to replacing DEGDB with 2×RDP. The prophetic data of Table 6 shows the predicted level of DEGDB required at various RDP levels to maintain a room temperature Tg.

TABLE 6

Predicted Levels of RDP and DEGDB

| RDP (wt %) | DEGDB (wt %) | Tg (° C.) |
|---|---|---|
| 0 | 20 | 22 |
| 5 | 17.5 | 23 |
| 10 | 15 | 21 |
| 15 | 10 | 23 |
| 20 | 6 | 20 |

Examples 13-20

Flame retardant polyester compositions were prepared using the general procedure described above but using various phosphate flame retardants at a concentration of 10 wt % based on the total weight of the polyester composition. Results are presented in Table 7.

TABLE 7

| Example | Flame Retardant | Average Burn Rate | Tg ° C. |
|---|---|---|---|
| 13 | NCENDX ® P-30 b (available from Albemarle Chemical Co.) | 0 | 15 |
| 14 | Tilauryl Phosphite | 0 | |
| 15 | Triphenyl Phosphate | 0 | −4 |
| 16 | Reofos ® 507 (Mixture of Triaryl Phosphates "TAP"; TAP tert butylated; Mono(t-butyl phenyl) diphenyl Phosphate, available from Great Lakes Chemical Co.) | (2 samples) 48 (1 sample) | 6 |
| 17 | Bisphenol-A Diphosphate | 0 | 12 |
| 18 | Trixylenyl Phosphate | 0 | 4 |
| 19 | Tricresyl Phosphate | 0 | −12 |
| 20 | Isodecyl diphenyl Phosphate | 87 | −8 |

We claim:

1. A flame retardant polyester composition for calendering, comprising:
   (a) a polyester having a crystallization half time from a molten state of at least 5 minutes wherein said polyester is a random copolymer;
   (b) about 10 to about 40 wt % of a plasticizer capable of dissolving a 5-mil (0.127 mm) thick film of said polyester to produce a clear solution at a temperature of 23° C. to 160° C.;
   (c) a phosphorus-containing flame retardant miscible with said polyester plasticized with said plasticizer; and
   (d) an additive effective to prevent sticking of the polyester to calendering rolls.

2. The polyester composition of claim 1 wherein said plasticizer comprises one or more aromatic rings.

3. The polyester composition of claim 1 wherein said plasticizer has a solubility parameter in the range of about 9.5 to about 13.0 cal$^{0.5}$ cm$^{-1.5}$.

4. The polyester composition of 3 wherein said plasticizer is an ester comprising
   (i) an acid residue comprising one or more of: phthalic acid, adipic acid, trimellitic acid, benzoic acid, azelaic acid, terephthalic acid, isophthalic acid, butyric acid, glutaric acid, citric acid or phosphoric acid; and (ii) an alcohol residue comprising one or more aliphatic, cycloaliphatic, or aromatic alcohols containing up to about 20 carbon atoms.

5. The polyester composition of claim 4 wherein said alcohol residue of the plasticizer is methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, or diethylene glycol.

6. The polyester composition of claim 5 wherein said crystallization half time of the polyester is at least 12 minutes.

7. The polyester composition of claim 6 wherein said crystallization half time is at least 300 minutes.

8. The polyester composition of claim 7 wherein said polyester comprises (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 10 to about 90 mole percent 1,4-cyclohexanedimethanol and 10 to about 90 mole percent of one or more diols containing 2 to about 20 carbon atoms, wherein said diacid residues are based on 100 mole percent and the diol residues are based on 100 mole percent.

9. The polyester composition of claim 8 wherein said diol residues comprise one or more diols selected from the group consisting of ethylene glycol, 1,2-propanediol, 1,3-propanediol, propylene glycol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol.

10. The polyester composition of claim 9 wherein said diol residues comprise about 20 to about 70 mole percent 1,4-cyclohexanedimethanol and 30 to about 80 mole percent ethylene glycol.

11. The polyester composition of claim 10 wherein said diacid residues further comprise 0 to about 20 mole percent of one or more modifying diacids containing about 4 to about 40 carbon atoms.

12. The polyester composition of claim 11 wherein said modifying diacid comprises one or more of: succinic acid, glutaric acid, adipic acid, suberic acid, sebacic acid, azelaic acid, dimer acid, or sulfoisophthalic acid.

13. The polyester composition of claim 12 wherein said plasticizer comprises one or more benzoates, phthalates, phosphates, or isophthalates.

14. The polyester composition of claim 13 wherein said plasticizer comprises diethylene glycol dibenzoate.

15. The polyester composition of claim 14 wherein said flame retardant comprises about 5 to about 40 wt %, based on the total weight of said polyester composition, of one or more monoesters, diesters, or triesters of phosphoric acid.

16. The polyester composition of claim 15 wherein said flame retardant is a plasticizer for said polyester.

17. The polyester composition of claim 16 wherein said flame retardant comprises resorcinol bis(diphenyl phosphate).

18. The polyester composition of claim 17 wherein said polyester composition has a $T_g$ of 30° C. or less.

19. The polyester composition of claim 18 wherein said polyester composition has a $T_g$ of 20° C. or less.

20. A flame retardant polyester composition for calendering, comprising:
(a) a polyester having a crystallization half time from a molten state of at least 10 minutes wherein said polyester is a random copolymer comprising (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 20 to about 40 mole percent 1,4-cyclohexanedimethanol and about 60 to about 80 mole percent of one or more diols containing 2 to about 20 carbon atoms, wherein said diacid residues are based on 100 mole percent and the diol residues are based on 100 mole percent;
(b) about 10 wt % to about 40 wt % of a plasticizer comprising one or more benzoates, phthalates, phosphates, or isophthalates, wherein said plasticizer is capable of dissolving a 5-mil (0.127 mm) thick film of said polyester to produce a clear solution at a temperature of 23° C. to 160° C.;
(c) about 5 wt % to about 40 wt % of a phosphorus-containing flame retardant miscible with said polyester plasticized with said plasticizer; and
(d) an additive effective to prevent sticking of the polyester to calendering rolls, wherein said wt % is based upon the total weight of said polyester composition.

21. The polyester composition of claim 20 wherein said additive comprises about 0.1 wt % to about 10 wt %, based on the total weight of the polyester composition, of one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

22. The polyester composition of claim 21 wherein said additive comprises erucylamide, stearamide, calcium stearate, zinc stearate, stearic acid, oleic acid, palmitic acid, paraffin wax, polyethylene waxes, polypropylene waxes, carnauba wax, glycerol monostearate, or glycerol distearate.

23. The polyester composition of claim 22 further comprising (e) an oxidative stabilizer.

24. The polyester resin composition of claim 23 further comprising (f) a melt strength enhancer.

25. The polyester composition of claim 21 wherein said additive comprises (i) a fatty acid or a salt of a fatty acid containing more than 18 carbon atoms and (ii) an ester wax comprising a fatty acid residue containing more than 18 carbon atoms with an alcohol residue containing from 2 to 28 carbon atoms, wherein the ratio of said fatty acid or said salt of a fatty acid to said ester wax is 1:1 or greater.

26. The polyester composition of claim 25 wherein said additive is present from about 0.1 to about 2 weight percent.

27. The polyester composition of claim 26 wherein said fatty acid comprises montanic acid; said salt of a fatty acid comprises one or more of: the sodium salt of montanic acid, the calcium salt of montanic acid, or the lithium salt of montanic acid; and said fatty acid residue of said ester wax comprises montanic acid.

28. The polyester composition of claim 27 wherein said alcohol residue of said ester wax comprises one or more of: montanyl alcohol, ethylene glycol, butylene glycol, glycerol or pentaerythritol.

29. The polyester composition of claim 28 wherein said ester wax has been partially saponified with calcium hydroxide.

30. The polyester composition of claim 29 wherein the ratio of said fatty acid or said salt of a fatty acid to said ester wax is 2:1 or greater.

31. A process for preparing a flame retardant film or a sheet, comprising:
calendering a polyester composition comprising (a) a polyester having a crystallization half time from a molten state of at least 5 minutes, wherein said polyester is a random copolymer;

(b) about 10 to about 40 wt % of a plasticizer capable of dissolving a 5-mil (0.127 mm) thick film of said polyester to produce a clear solution at a temperature of 23° C. to 160° C.;

(c) a phosphorus-containing flame retardant miscible with said polyester plasticized with said plasticizer; and (d) an additive effective to prevent sticking of the polyester to calendering rolls.

32. The process of claim 31 wherein said plasticizer comprises one or more aromatic rings.

33. The process of claim 31 wherein said plasticizer has a solubility parameter in the range of about 9.5 to about 13.0 $cal^{0.5} \, cm^{-1.5}$.

34. The process of 33 wherein said plasticizer is an ester comprising (i) an acid residue comprising one or more of: phthalic acid, adipic acid, benzoic acid, azelaic acid, terephthalic acid, isophthalic acid, butyric acid, glutaric acid, or phosphoric acid; and (ii) an alcohol residue comprising one or more of: methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, or diethylene glycol.

35. The process of claim 34 wherein said polyester composition comprises a molten, pellet or powder form and is passed through a compressive nip between at least two calendering rolls at temperatures of about 100° C. to about 200° C.

36. The process of claim 35 wherein said polyester has a crystallization half time of at least 300 minutes.

37. The process of claim 36 wherein said polyester comprises (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 10 to about 90 mole percent 1,4-cyclohexanedimethanol and 10 to about 90 mole percent of one or more diols selected from the group consisting of ethylene glycol, 1,2-propanediol, 1,3-propanediol, propylene glycol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol, wherein said diacid residues are based on 100 mole percent and said diol residues are based on 100 mole percent.

38. The process of claim 37 wherein said diol residues comprise about 20 to about 70 mole percent 1,4-cyclohexanedimethanol and 30 to about 80 mole percent ethylene glycol.

39. The process of claim 38 wherein said plasticizer comprises one or more benzoates, phthalates, phosphates, or isophthalates.

40. The process of claim 39 wherein said plasticizer comprises diethylene glycol dibenzoate.

41. The process of claim 40 wherein said flame retardant comprises about 5 to about 40 wt %, based on the total weight of said polyester composition, of one or more monoesters, diesters, or triesters of phosphoric acid.

42. The process of claim 41 wherein said flame retardant is a plasticizer for said polyester.

43. The process of claim 42 wherein said flame retardant comprises resorcinol bis(diphenyl phosphate).

44. The process of claim 43 wherein said polyester composition has a $T_g$ of 30° C. or less.

45. The process of claim 44 wherein said additive comprises about 0.1 wt % to about 10 wt %, based on the total weight of the polyester composition, of one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

46. The process of claim 45 wherein said additive comprises (i) a fatty acid or a salt of a fatty acid containing more than 18 carbon atoms and (ii) an ester wax comprising a fatty acid residue containing more than 18 carbon atoms and an alcohol residue containing from 2 to 28 carbon atoms, wherein the ratio of said fatty acid or said salt of a fatty acid to said ester wax is 1:1 or greater.

47. The process of claim 46 wherein said fatty acid comprises montanic acid; said salt of a fatty acid comprises one or more of: the sodium salt of montanic acid, the calcium salt of montanic acid, or the lithium salt of montanic acid; and said fatty acid residue of said ester wax comprises montanic acid.

48. A flame retardant film or sheet comprising a polyester composition, said polyester composition comprising (a) a polyester having a crystallization half time from a molten state of at least 5 minutes, wherein said polyester is a random copolymer;

(b) about 10 to about 40 wt % of a plasticizer capable of dissolving a 5-mil (0.127 mm) thick film of said polyester to produce a clear solution at a temperature of 23° C. to 160° C.;

(c) an phosphorus-containing flame retardant miscible with said polyester plasticized with said plasticizer; and (d) an additive effective to prevent sticking of the polyester to calendering rolls, wherein said film or sheet is prepared by calendering said polyester composition.

49. The film or sheet of claim 48 wherein said plasticizer comprises one or more aromatic rings.

50. The film or sheet of claim 48 wherein said plasticizer has a solubility parameter in the range of about 9.5 to about 13.0 $cal^{0.5} \, cm^{-1.5}$.

51. The film or sheet of 50 wherein said plasticizer is an ester comprising (i) an acid residue comprising one or more of: phthalic acid, adipic acid, benzoic acid, azelaic acid, terephthalic acid, isophthalic acid, butyric acid, glutaric acid, or phosphoric acid; and (ii) an alcohol residue comprising one or more of: methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, or diethylene glycol.

52. The film or sheet of claim 51 wherein said polyester has a crystallization half time of at least 300 minutes.

53. The film or sheet of claim 52 wherein said polyester comprises (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 10 to about 90 mole percent 1,4-cyclohexanedimethanol and 10 to about 90 mole percent of one or more diols selected from the group consisting of ethylene glycol, 1,2-propanediol, 1,3-propanediol, propylene glycol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol, wherein said diacid residues are based on 100 mole percent and said diol residues are based on 100 mole percent.

54. The film or sheet of claim 53 wherein said diol residues comprise about 20 to about 70 mole percent 1,4-cyclohexanedimethanol and 30 to about 80 mole percent ethylene glycol.

55. The film or sheet of claim 54 wherein said plasticizer comprises one or more benzoates, phthalates, phosphates, or isophthalates.

56. The film or sheet of claim 55 wherein said plasticizer comprises diethylene glycol dibenzoate.

57. The film or sheet of claim 56 wherein said flame retardant comprises about 5 to about 40 wt %, based on the total weight of said polyester composition, of one or more monoesters, diesters, or triesters of phosphoric acid.

58. The film or sheet of claim 57 wherein said flame retardant is a plasticizer for said polyester.

59. The film or sheet of claim 58 wherein said flame retardant comprises resorcinol bis(diphenyl phosphate).

60. The film or sheet of claim 59 wherein said polyester composition has a $T_g$ of 30° C. or less.

61. The film or sheet of claim 60 wherein said additive about 0.1 wt % to about 10 wt %, based on the total weight of the polyester composition, of one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

62. The film or sheet of claim 61 wherein said additive comprises (i) a fatty acid or a salt of a fatty acid containing more than 18 carbon atoms and (ii) an ester wax comprising a fatty acid residue containing more than 18 carbon atoms and an alcohol residue containing from 2 to 28 carbon atoms, wherein the ratio of said fatty acid or said salt of a fatty acid to said ester wax is 1:1 or greater.

63. The film or sheet of claim 62 wherein said fatty acid comprises montanic acid; said salt of a fatty acid comprises one or more of: the sodium salt of montanic acid, the calcium salt of montanic acid, or the lithium salt of montanic acid; and said fatty acid residue of said ester wax comprises montanic acid.

64. A flame retardant polyester composition for calendering, comprising:
  (a) about 50 to about 95 weight percent of a polyester having a melting temperature of less than 220° C. and exhibiting more than 1 percent crystallinity after annealing for 2000 minutes at a temperature at which said polyester has a maximum crystallization rate, wherein said polyester is a random copolymer;
  (b) about 10 to about 40 wt % of a plasticizer capable of dissolving a 5-mil (0.127 mm) thick film of said polyester to produce a clear solution at a temperature of 23° C. to 160° C.; and
  (c) a phosphorus-containing flame retardant miscible with said polyester plasticized with said plasticizer.

65. The polyester composition of claim 64 wherein said plasticizer comprises one or more aromatic rings.

66. The polyester composition of claim 65 further comprising (d) an additive effective to prevent sticking of the polyester to the calender rolls.

67. The polyester composition of claim 64 wherein said plasticizer has a solubility parameter in the range of about 9.5 to about 13.0 $cal^{0.5}$ $cm^{-1.5}$.

68. The polyester composition of claim 67 wherein said plasticizer is an ester comprising (i) an acid residue comprising one or more of: phthalic acid, adipic acid, benzoic acid, azelaic acid, terephthalic acid, isophthalic acid, butyric acid, glutaric acid, or phosphoric acid; and
  (ii) an alcohol residue comprising one or more of: methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, or diethylene glycol.

69. The polyester composition of claim 68 wherein said polyester comprises (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 10 to about 90 mole percent 1,4-cyclohexanedimethanol and 10 to about 90 mole percent of one or more diols selected from the group consisting of ethylene glycol, 1,2-propanediol, 1,3-propanediol, propylene glycol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol, wherein said diacid residues are based on 100 mole percent and said diol residues are based on 100 mole percent.

70. The polyester composition of claim 69 wherein said diol residues comprise about 20 to about 70 mole percent 1,4-cyclohexanedimethanol and 30 to about 80 mole percent ethylene glycol.

71. The polyester composition of claim 70 wherein said plasticizer comprises one or more benzoates, phthalates, phosphates, or isophthalates.

72. The polyester composition of claim 71 wherein said plasticizer comprises diethylene glycol dibenzoate.

73. The polyester composition of claim 72 wherein said flame retardant comprises about 5 to about 40 wt %, based on the total weight of said polyester composition, of one or more monoesters, diesters, or triesters of phosphoric acid.

74. The polyester composition of claim 73 wherein said flame retardant is a plasticizer for said polyester.

75. The polyester composition of claim 74 wherein said flame retardant comprises resorcinol bis(diphenyl phosphate).

76. The polyester composition of claim 75 wherein said polyester composition has a $T_g$ of 30° C. or less.

77. A process for preparing a flame retardant film or a sheet, comprising:
  (i) calendering a polyester composition comprising
    (a) about 50 to about 95 weight percent of a polyester having a melting temperature of less than 220° C. and exhibiting more than 1 percent crystallinity after annealing for 2000 minutes at a temperature at which said polyester has a maximum crystallization rate, wherein said polyester is a random copolymer;
    (b) about 10 to about 40 wt % of a plasticizer capable of dissolving a 5-mil (0.127 mm) thick film of said polyester to produce a clear solution at a temperature of 23° C. to 160° C.; and
    (c) a phosphorus-containing flame retardant miscible with said polyester plasticized with said plasticizer; and
  (ii) inducing crystallization during step (i) or after step (i).

78. The process of claim 77 wherein said plasticizer comprises one or more aromatic rings.

79. The process of claim 77 wherein said plasticizer has a solubility parameter in the range of about 9.5 to about 13.0 $cal^{0.5}$ $cm^{-1.5}$.

80. The process of claim 79 wherein said plasticizer is an ester comprising
  (i) an acid residue comprising one or more of: phthalic acid, adipic acid, benzoic acid, azelaic acid, terephthalic acid, isophthalic acid, butyric acid, glutaric acid, or phosphoric acid; and
  (ii) an alcohol residue comprising one or more of methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, or diethylene glycol.

81. The process of claim 80 wherein said polyester comprises (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 10 to about 90 mole percent 1,4-cyclohexanedimethanol and 10 to about 90 mole percent of one or more diols selected from the group consisting of ethylene glycol, 1,2-propanediol, 1,3-propanediol, propylene glycol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol, wherein said diacid residues are based on 100 mole percent and said diol residues are based on 100 mole percent.

82. The process of claim 81 wherein said diol residues comprise about 20 to about 70 mole percent 1,4-cyclohexanedimethanol and 30 to about 80 mole percent ethylene glycol.

83. The process of claim 82 wherein said plasticizer comprises one or more benzoates, phthalates, phosphates, or isophthalates.

84. The process of claim 83 wherein said plasticizer comprises diethylene glycol dibenzoate.

85. The process of claim 84 wherein said flame retardant comprises about 5 to about 40 wt %, based on the total weight of said polyester composition, of one or more monoesters, diesters, or triesters of phosphoric acid.

86. The process of claim 85 wherein said flame retardant is a plasticizer for said polyester.

87. The process of claim 86 wherein said flame retardant comprises resorcinol bis(diphenyl phosphate).

88. The process of claim 87 wherein said polyester composition has a $T_g$ of 30° C. or less.

89. The process of claim 88 wherein said polyester composition comprises a molten, pellet or powder form and is passed through a compressive nip between at least two calendering rolls at temperatures of about 100° C. to about 200° C.

90. A flame retardant film or sheet, comprising;
  (a) about 50 to about 95 weight percent of a polyester having a melting temperature of less than 220° C. and exhibiting more than 1 percent crystallinity after annealing for 2000 minutes at a temperature at which said polyester has a maximum crystallization rate, wherein said polyester is a random copolymer;
  (b) about 10 to about 40 weight percent of a plasticizer capable of dissolving a 5-mil (0.127 mm) thick film of said polyester to produce a clear solution at a temperature of 23° C. to 160° C.; and
  (c) a phosphorus-containing flame retardant miscible with said polyester plasticized with said plasticizer.

91. The film or sheet of claim 90 wherein said plasticizer comprises one or more aromatic rings.

92. The film or sheet of claim 90 wherein said plasticizer has a solubility parameter in the range of about 9.5 to about 13.0 $cal^{0.5} cm^{-1.5}$.

93. The film or sheet of claim 92 wherein said plasticizer is an ester comprising
  (i) an acid residue comprising one or more of: phthalic acid, adipic acid, benzoic acid, azelaic acid, terephthalic acid, isophthalic acid, butyric acid, glutaric acid, or phosphoric acid; and
  (ii) an alcohol residue comprising one or more of methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, or diethylene glycol.

94. The film or sheet of claim 93 wherein said polyester comprises (i) at least 80 mole percent of diacid residues comprising one or more of: terephthalic acid, naphthalenedicarboxylic acid, 1,4-cyclohexanedicarboxylic acid, or isophthalic acid; and (ii) diol residues comprising about 10 to about 90 mole percent 1,4-cyclohexanedimethanol and 10 to about 90 mole percent of one or more diols selected from the group consisting of ethylene glycol, 1,2-propanediol, 1,3-propanediol, propylene glycol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol, wherein said diacid residues are based on 100 mole percent and said diol residues are based on 100 mole percent.

95. The film or sheet of claim 94 wherein said diol residues comprise about 20 to about 70 mole percent 1,4-cyclohexanedimethanol and 30 to about 80 mole percent ethylene glycol.

96. The film or sheet of claim 95 wherein said plasticizer comprises one or more benzoates, phthalates, phosphates, or isophthalates.

97. The film or sheet of claim 96 wherein said plasticizer comprises diethylene glycol dibenzoate.

98. The film or sheet of claim 97 wherein said flame retardant comprises about 5 to about 40 wt %, based on the total weight of said polyester composition, of one or more monoesters, diesters, or triesters of phosphoric acid.

99. The film or sheet of claim 98 wherein said flame retardant is a plasticizer for said polyester.

100. The film or sheet of claim 99 wherein said flame retardant comprises resorcinol bis(diphenyl phosphate).

101. The film or sheet of claim 100 wherein said polyester composition has a $T_g$ of 30° C. or less.

* * * * *